United States Patent [19]

Le Naour

[11] Patent Number: 5,201,788

[45] Date of Patent: Apr. 13, 1993

[54] METHOD OF AND DEVICE FOR CUTTING OFF THE UPPER PART OF A CLOSED CONTAINER OF PLASTICS OR OTHER MATERIAL

[75] Inventor: Laurent J. Le Naour, Vernouillet, France

[73] Assignee: Stork Dardaine Industries S.A., France

[21] Appl. No.: 841,554

[22] Filed: Feb. 26, 1992

[30] Foreign Application Priority Data

Feb. 26, 1991 [FR] France ................................ 91 02281

[51] Int. Cl.[5] ............................................. B65B 61/08
[52] U.S. Cl. ..................................... 53/468; 53/381.2; 53/561; 83/411.1
[58] Field of Search ................. 53/381.2, 468, 561; 83/410.8, 411.5, 411.3, 411.1

[56] References Cited

U.S. PATENT DOCUMENTS

| | | | |
|---|---|---|---|
| 3,757,622 | 8/1973 | Berry | 53/381.2 X |
| 3,818,785 | 6/1974 | Wakabayashi | 53/561 X |
| 3,897,670 | 8/1975 | Hansen | 53/561 X |

FOREIGN PATENT DOCUMENTS

| | | |
|---|---|---|
| 1376498 | 9/1964 | France . |
| 1499446 | 9/1967 | France . |
| 2132104 | 11/1972 | France . |
| 2213148 | 8/1974 | France . |
| 2261119 | 9/1975 | France . |
| 8804589 | 6/1988 | PCT Int'l Appl. . |

*Primary Examiner*—James F. Coan
*Attorney, Agent, or Firm*—Steinberg & Raskin

[57] ABSTRACT

A method of and device for cutting off the upper portion of a closed container of plastics material for example, the device comprising above a vertically movable bottle support, three overlying clamps adapted to tightly conform to the neck of the bottle and a blade rotatably mounted between two clamps, the three clamps and the blade being made fast to concentric rotary shafts, respectively, each one operable by a link.

8 Claims, 5 Drawing Sheets

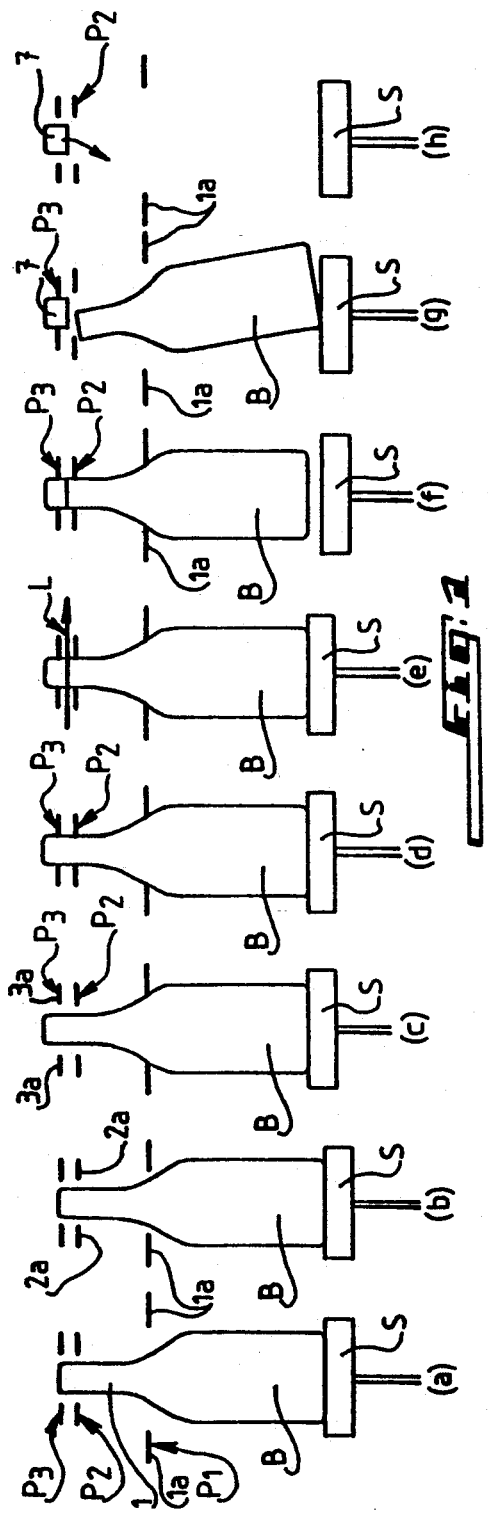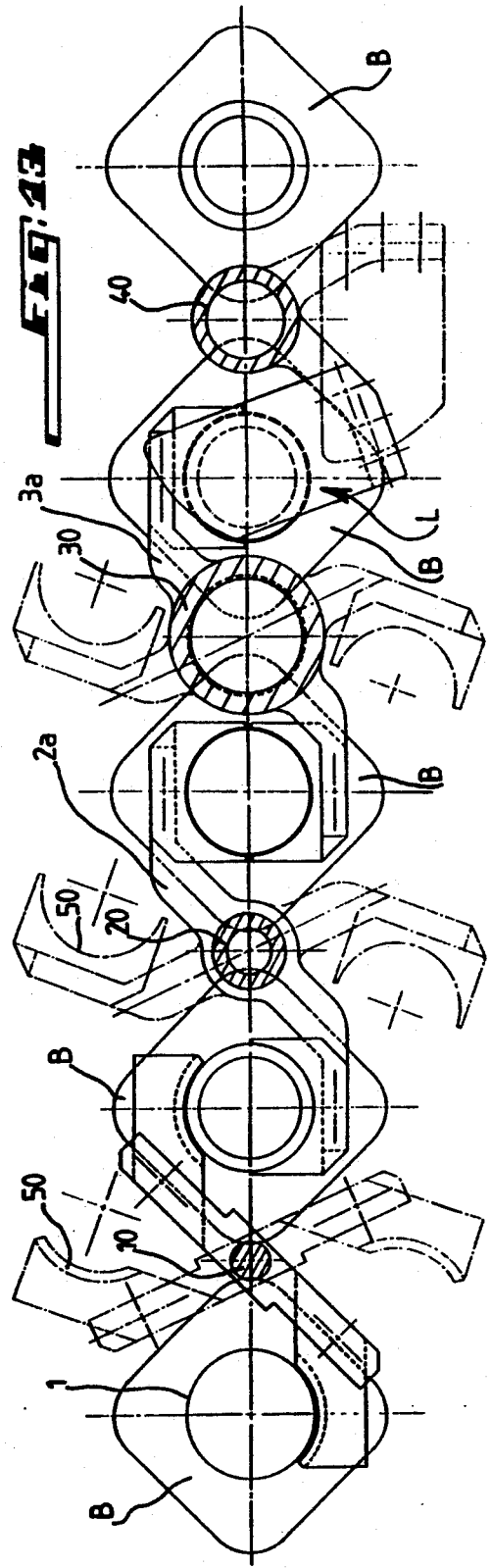

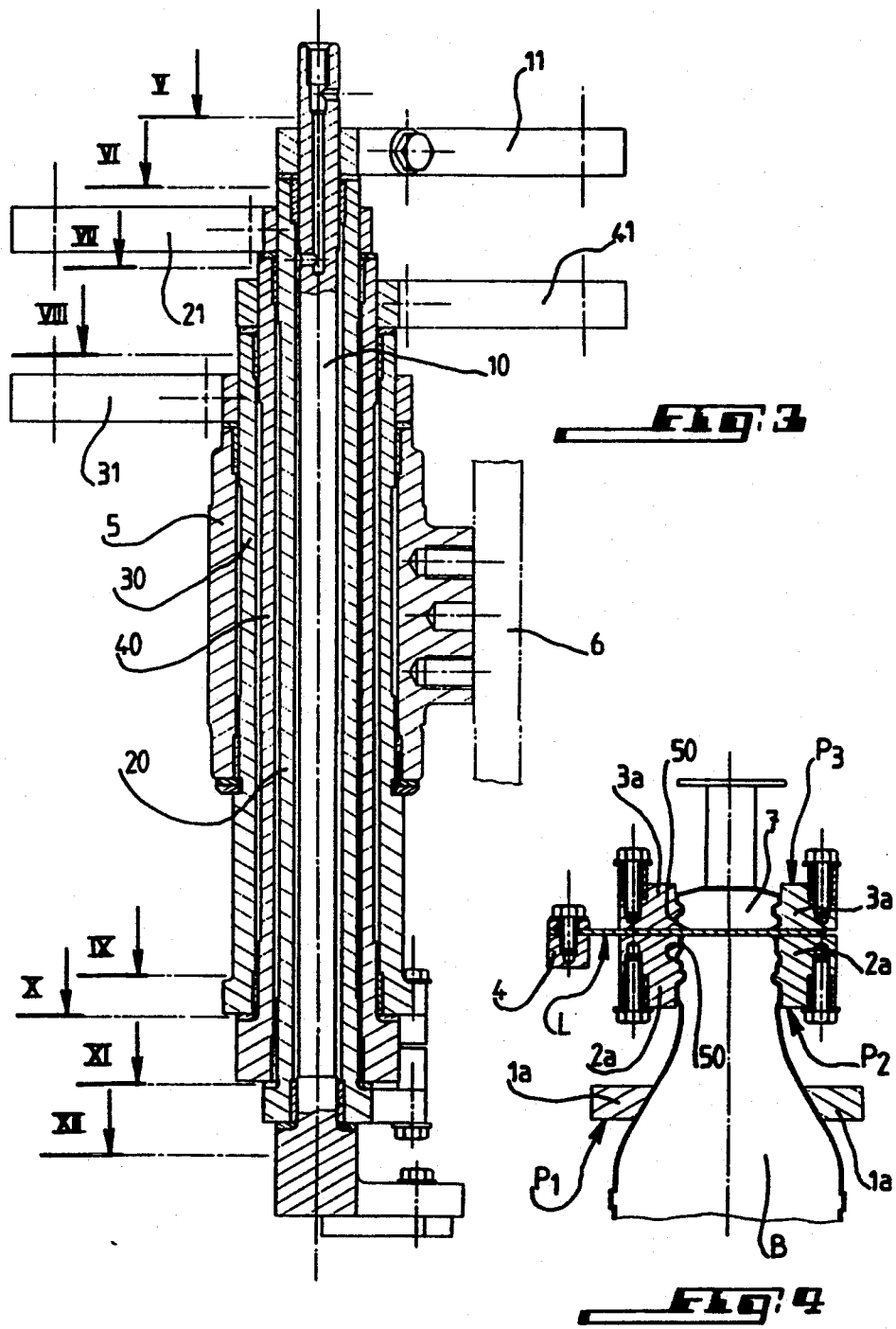

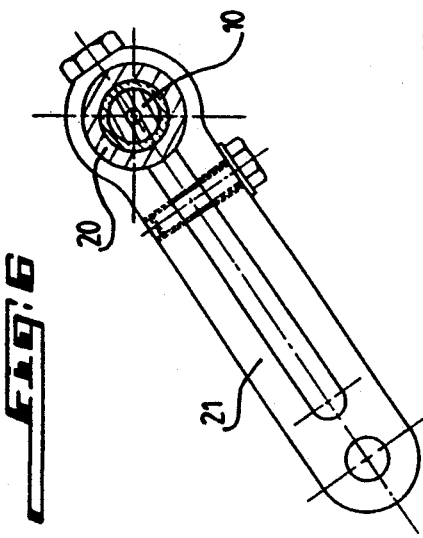
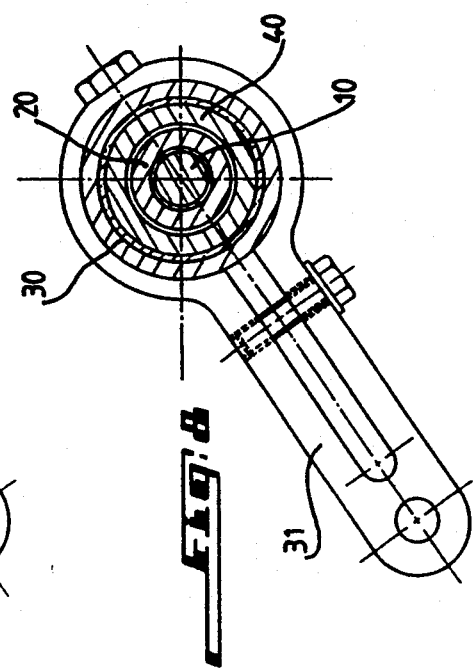
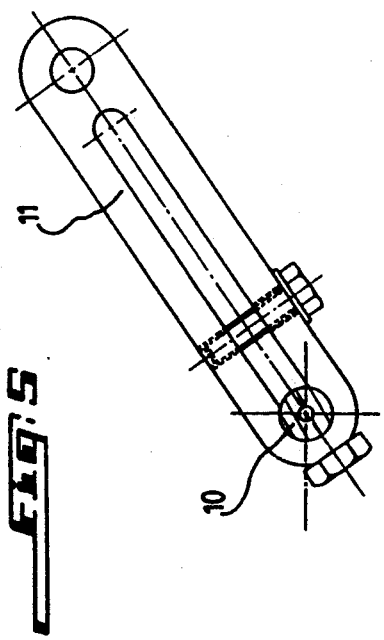
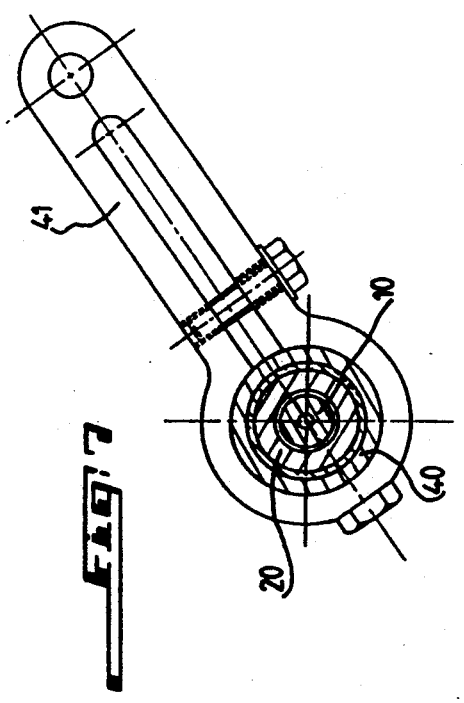

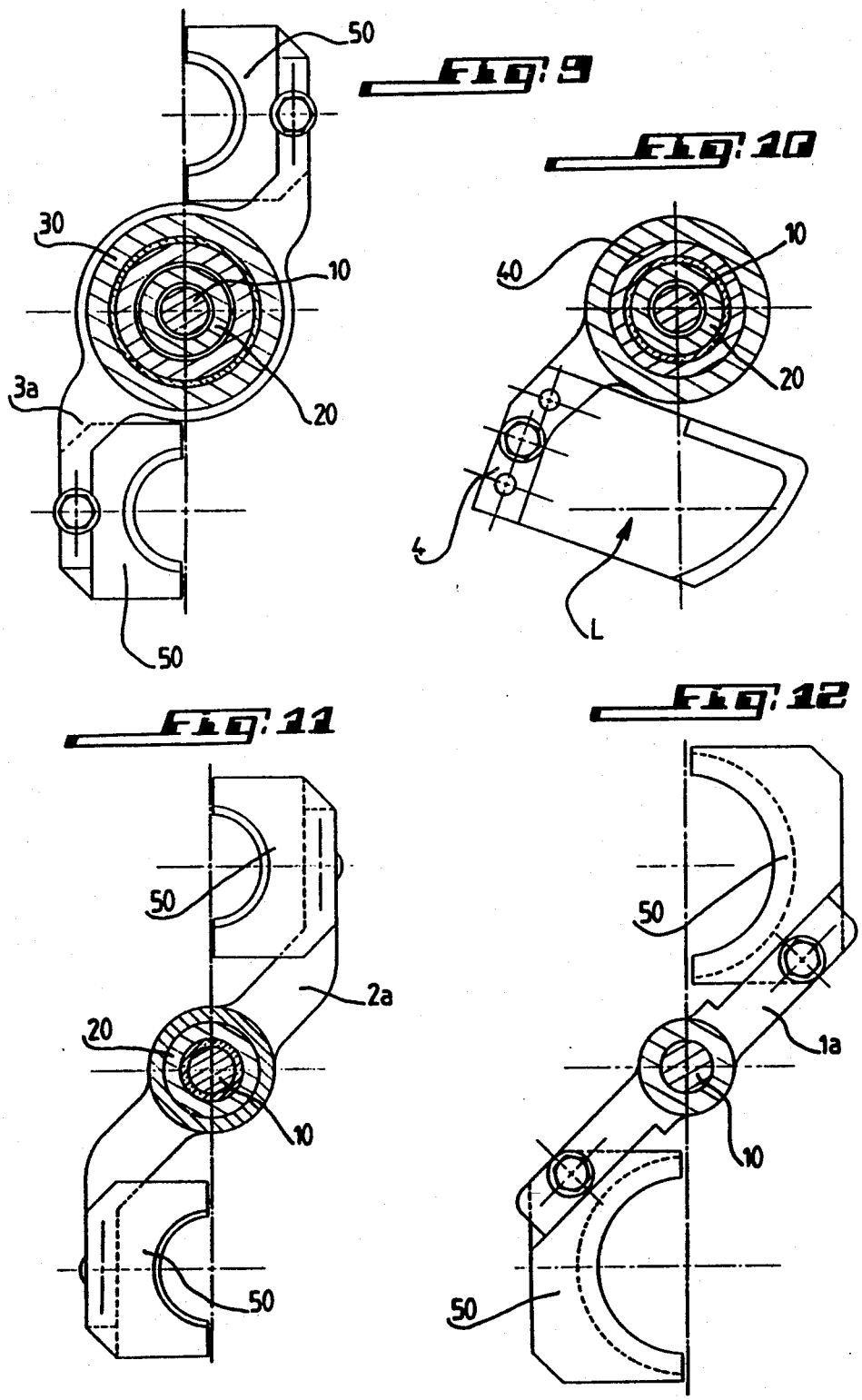

METHOD OF AND DEVICE FOR CUTTING OFF THE UPPER PART OF A CLOSED CONTAINER OF PLASTICS OR OTHER MATERIAL

The present invention relates essentially to a method of cutting off or severing the upper portion of a closed container of plastics or other material.

It is also directed to a device for carrying out this method.

There has already been proposed various systems for severing or cutting off the necks of closed bottles of plastics material proceeding from an extruder or from a storage stock.

These systems generally comprised means for nipping the neck of the bottle in order to subsequently allow the cutting off by means of one or several blades consisting for instance of one or several cutting wheels.

Such systems however were of a relatively complicated mechanical design. Their operating reliability therefore was uncertain which means that in the case of the cutting off of a sequence or line of bottles there often occurred technical hitches requiring the stopping of the system and the calling for an agent. It is understandable that this represented a loss of time and was expensive of course.

Therefore the object of the present invention is to cope with these inconveniences by providing a system for cutting off necks of closed bottles which is of a remarkably simple mechanical design and exhibits an outstanding operating reliability without any risk of technical hitches during the cutting off the necks of a plurality of bottles.

For that purpose the subject of the invention is a method of cutting off the upper portion of a closed container forming a neck of a bottle for instance and of the type consisting in holding the bottle in order to allow to cut off the neck by means of a blade or the like, characterized in that with the bottle initially resting upon a vertically movable support, it consists in closing a first clamp located at the level of the upper part of the bottle below the neck, lifting the support of the bottle so that it comes in abutment with its upper portion against the said first clamp thus constituting a reference stop, closing a second clamp located above the first clamp about the neck of the bottle, closing at the same time or not as the closing of the second clamp, a third clamp located above this second clamp about the neck of the bottle, actuating the blade so that it passes between the second and the third clamps in order to sever the neck of the bottle, and opening the three clamps to separate the bottle from the free and closed end of the neck cut off by the blade.

It should be specified here that before opening the free aforesaid clamps the support of the bottle is lowered and then the first and the second clamps are opened simultaneously or not to allow the discharge of the bottle and thereafter once the bottle has been discharged, the third clamp is opened to allow the discharge of the free closed and cut off end of the neck of the bottle.

This invention is further directed to a device for performing the method referred to hereinabove and of the kind comprising means for holding the neck of the bottle through clamping as well as a means for cutting off this neck, this device being essentially characterized in that it comprises above one vertically movable bottle support two overlying clamps adapted to tightly conform to the neck of the bottle and a blade rotatably mounted between these two clamps, both clamps and the blade being respectively made fast to concentric rotary shafts operable each one by a link or the like.

According to another characterizing feature of this device, there is provided underneath both aforesaid clamps another clamp which forms a reference stop for the bottle lifted by the aforesaid support and which is made fast to a rotary shaft which also is operable by a link or like connecting rod and arranged in concentric relation to the aforesaid concentric rotary shafts.

According to a preferred embodiment each clamp consists of two arms co-operating through one end with the bottle, each arm being made fast to a rotary shaft concentric with the shafts made fast to the other pairs of arms constituting the other clamps.

According to still a further characterizing feature of this device both ends of each arm of overlying clamps are shaped to co-operate with the ends of adjacent arms and several stacks of overlying clamps are thus formed for clamping and cutting off the necks of a line of bottles carried each one by a vertically movable support.

It should further be specified that the blade passing between two clamps is removably mounted on a holder made fast to a rotary shaft concentric with the shafts carrying the arms of each clamp.

The invention will be better understood and further objects, characterizing features, details and advantages thereof will appear more clearly as the following explanatory description proceeds with reference to the accompanying diagrammatic drawings given by way of non limiting example only illustrating a presently preferred specific embodiment of the invention and wherein:

FIG. 1 diagrammatically illustrates the different steps of the method according to this invention allowing to cut off the neck of a closed bottle;

FIG. 3 is a view in section taken upon the line III—III of FIG. 2;

FIG. 4 is a view in section taken upon the line IV—IV of FIG. 2 and showing the severing of the neck of a bottle;

FIGS. 5, 6, 7 and 8 are views in cross-sections taken upon the lines V, VI, VII and VIII, respectively, of FIG. 3;

Figure 2:
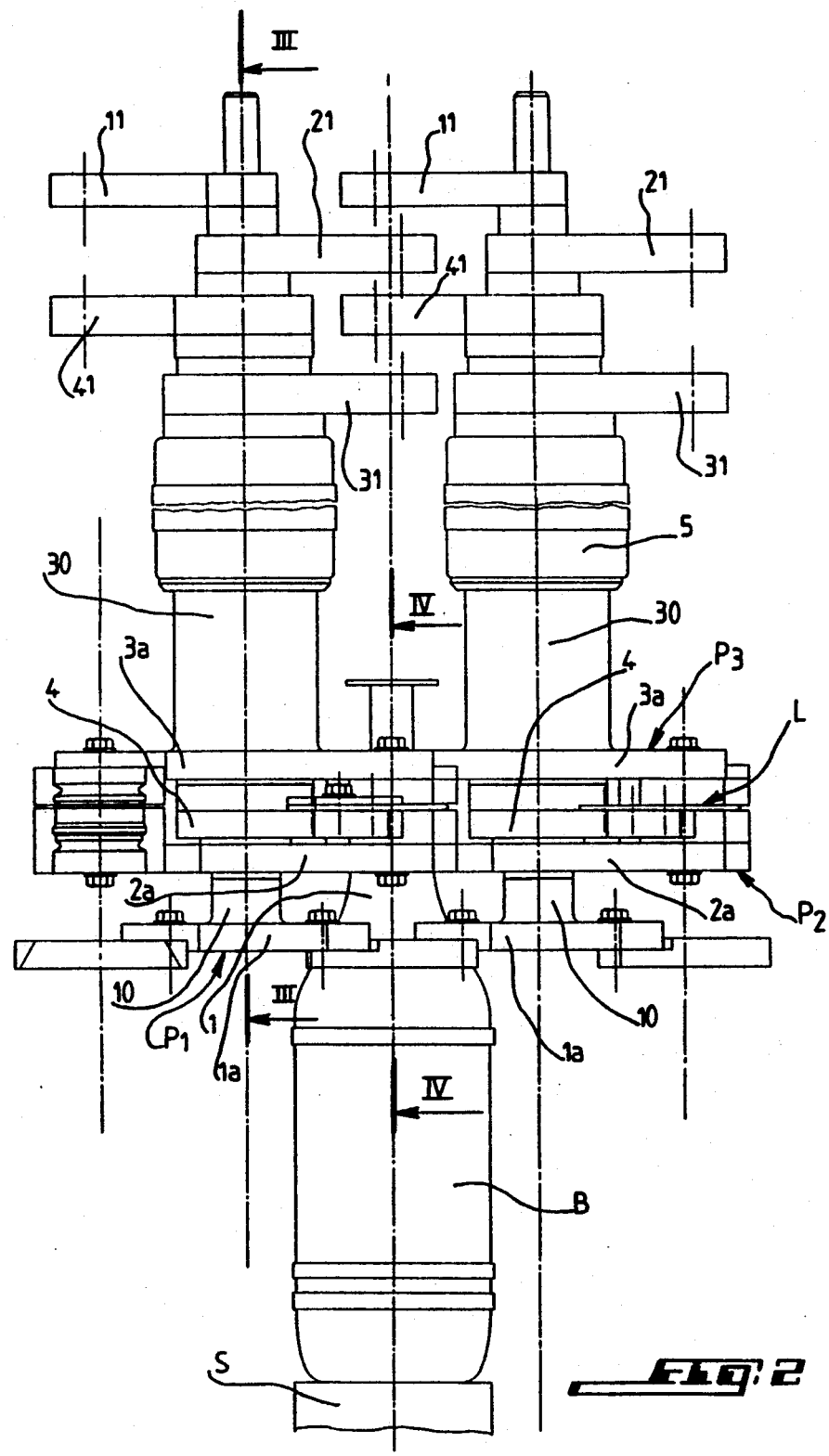
FIG. 2 is an outside elevational view of the device with three overlying clamps and a cutting blade, according to this invention.

FIGS. 9, 10, 11 and 12 are views in cross-sections taken upon the lines IX, X, XI and XII, respectively, of FIG. 3; and FIG. 13 shows in cross-section the three overlying clamps and the cutting blade co-operating with a line of bottles, the cross-section being made at several levels as shown on FIG. 3. More specifically from left to right on FIG. 13 are successively shown sections along the lines XII (first clamp), XI (second clamp), IX (third or upper clamp) and X (cutting blade).

According to the exemplary embodiment shown on the drawings a device according to this invention for severing or cutting off the neck 1 of closed bottles of plastics material B essentially comprises a vertically movable support S for the said bottles, three overlying clamps generally designated at $P_1$, $P_2$, $P_3$ and a cutting blade L arranged between the clamps $P_2$ and $P_3$ (see in particular FIGS. 1, 2 and 4).

Each clamp $P_1$, $P_2$, $P_3$ consists essentially of two arms co-operating through one end with the bottle B, each arm being made fast in its middle to a rotary shaft.

More specifically and as seen in particular on FIGS. 2, 4, 12 and 13, the clamp $P_1$ which is the lower clamp consists of two arms 1a made fast with their middle portion to a rotary drive shaft 10. This rotary shaft as seen on FIGS. 2, 3 and 5 is also made fast to a link or like rod 11 allowing to rotate each arm 1a by any suitable means not shown.

The second clamp $P_2$ as seen on FIGS. 2, 3, 4, 11 and 13 also consists of two arms 2a made each one fast with its middle portion to a rotary shaft 20 externally concentric with the shaft 10. This shaft 20 as seen on FIGS. 2, 3 and 6 is also made fast to a link or like rod 21 urged by any suitable means not shown for rotating the said shaft and therefore both arms 2a.

As apparent from FIGS. 2, 3, 4 and 9, the clamp $P_3$ which is the upper clamp also consists of two arms 3a which are each one made fast with their middle portion to a rotary shaft 30 externally concentric with the shaft 20. Referring in particular to FIG. 8 there is seen that each arm 3a is made fast to a link or like rod 31 allowing by any suitable means not shown to rotate the shaft 30 and therefore the arms 3a.

At this stage it should be pointed out that the arms 1a, 2a and 3a comprise each one ends 50 (FIGS. 9, 11 and 12) which are shaped so as to be adapted to tightly co-operate with the neck 1 of a bottle B as explained subsequently in connection with the operation. It should however already be pointed out that both ends of an arm co-operate with one end of an adjacent arm after rotation of said arms for tightly enclosing or clamping the neck 1 of the bottle B.

Referring again to FIGS. 2, 3 and 4 as well as to FIG. 10 there is seen that the blade L is removably or detachably mounted on a holder 4 made fast to a shaft 40 externally concentric with the shaft 20 and internally concentric with the shaft 30. As seen on FIG. 7 in particular the shaft 40 is made fast to a link or like member 40 for joint rotation therewith, which may be driven by any suitable means not shown to rotate the shaft 40 and consequently the blade L made fast to the shaft through the medium of the holder 4.

Thus the staged assembly consisting of an arm 1a, an arm 2a, a blade L and a blade 3a constitutes three half-clamps with the blade interposed between the arm 2a and the arm 3a, all these elements being made fast to concentric rotary shafts 10, 20, 30, 40 which may be rotated through the agency of links 11, 21, 31, 41 themselves operable by any suitable means such as cams (not shown) for example.

On FIGS. 2 and 3 has been shown at 5 a quill supporting the aforesaid shafts and made fast to a frame 6.

With reference to FIG. 13 it is understandable that the device according to this invention may comprise several alined assemblies or sets of staged arms 1a, 2a, 3a with the blade L so as to carry out the severing of the necks of a line of bottles B, it being understood that the arms of an assembly or set are working with the corresponding arms of the adjacent assembly or set to clamp the bottles B.

Now for a better understanding of the invention, there will be hereinafter described in detail how the neck 1 of a bottle B is cut off more particularly with reference to FIG. 1.

Starting from FIG. 1a, the latter shows a bottle B the neck of which is to be cut off and resting upon the vertically movable support S whereas the clamps $P_1$, $P_2$, $P_3$ are open (the arms 1a, 2a, 3a being open).

As seen on FIG. 1b one begins to close the first or bottom clamp $P_1$ located in the lower area of the neck 1 of the bottle B.

Then as seen on FIG. 1c the support S of the bottle is raised so that the bottle is caused to abut with its upper portion (i.e. with its substantially tapering or conical portion connecting the neck 1 to the body of the bottle) upon the first clamp $P_1$ thus constituting a reference stop.

Then as seen on FIG. 1d, the clamps $P_2$ and $P_3$ are caused to be closed about the neck 1 of the bottle B, it being understood that these two clamps may be closed simultaneously or one after the other one.

The blade L as seen on FIG. 1e is then operatively driven and is severing the neck 1 of the bottle between the clamps $P_2$ and $P_3$, it being understood that the support S is still holding the bottle B applied against the first clamp $P_1$.

Afterwards the support S of the bottle is lowered as seen on FIG. 1f, the said bottle being kept suspended or hanging by the clamp $P_2$.

Then the clamps $P_1$ and $P_2$ are opened simultaneously or not as seen on FIG. 1g so that the bottle B may be discharged or moved away towards another station.

At last the discharge of the closed and severed free end 7 of the neck 1 of the bottle is carried out after the opening of the clamp $P_3$.

There has thus been provided according to the invention a method of and a device for cutting off the necks of closed bottles which are technically very simple, which exhibit an outstanding operating reliability and which allow a quick cutting off of the necks of a line of bottles without technical hitches.

It should be understood that the invention is not at all limited to the embodiment described and illustrated which has been given by way of example only.

Thus the means actuating the clamps and the blades may be of any kind whatsoever and the shaped ends of the clamp arms also may be of any kind whatsoever and be integral with or attached to these arms by being fastened thereto by any suitable means as shown on the Figures. Likewise there may be provided rings or bearing journals or bushes of any kind whatsoever between the various concentric shafts made fast to the arms and blades.

This means that the invention comprises all the technical equivalents of the means described as well as their combinations if same are carried out according to its gist and within the scope of the appended claims.

What is claimed is:

1. A method for cutting off the upper portion of a closed container, such as a bottle having a neck, comprising
   holding a bottle having a neck in order to allow severing of the neck by a blade member,
   resting the bottle upon a vertically movable support,
   closing a first clamp located at the level of an upper portion of the bottle below the neck,
   lifting the support of the bottle to cause the upper portion of the bottle to abut with the first clamp thus defining a reference stop,
   closing a second clamp located above the first clamp about the neck of the bottle,
   closing a third clamp located above the second clamp about the neck of the bottle, actuating the blade member to pass between the second and third clamps in order to sever the neck of the bottle, and opening the first, second and third clamps to separate the bottle from a separated end of the neck severed by the blade member.

2. A method according to claim 1, wherein before opening the first, second and third clamps, further comprising lowering the support of the bottle, thereafter opening the first and second clamps to allow the discharge of the bottle from the support, and opening the third clamp once the bottle has been discharged to allow the discharge of the separated end of the neck of the bottle.

3. A method according to claim 1, wherein the third clamp is closed about the neck of the bottle simultaneously with the second clamp.

4. A method according to claim 2, wherein the first and second clamps are opened simultaneously.

5. A device for cutting off the upper portion of a closed container, such as a bottle having a neck, comprising means for holding a neck of a bottle in clamped relationship, means for cutting off the neck, a vertically movable bottle support, first and second overlying clamps located above said vertically movable bottle support, said first and said second overlying clamps structured and arranged to tightly conform to the neck of the bottle, said first and said second clamps being made fast to first and second concentric rotary shafts, respectively, each of said first and second rotary shafts being operable by a link member, a third clamp arranged under said first and said second clamps, said third clamp defining a reference stop for the bottle raised by said support, said third clamp being made fast to a third rotary shaft operable by a link member, said third rotary shaft being concentric with said first and second rotary shafts, a blade member rotatably mounted between said first and said second clamps, said blade member being made fast to a fourth rotary shaft concentric with said first, second and third rotary shafts, said fourth rotary shaft being operable by a link member.

6. A device according to claim 5, wherein each of said first, second and third clamps consists of two arms co-operating through a first end with the bottle, each of said arms of said first, second and third clamps being made fast to said first, second and third rotary shafts, respectively.

7. A device according to claim 5, further comprising a holder, said blade member being removably mounted upon said holder, said holder being made fast to said fourth rotary shaft.

8. A device according to claim 6, wherein said arms have a second end, both said first and said second ends of each arm of said first, second and third clamps are shaped to co-operate with ends of adjacent arms such that several stacks of clamps are thus formed for clamping and cutting off the necks of a line of bottles carried individually by a plurality of said vertically movable supports.

* * * * *